US008536745B2

(12) United States Patent
Lee et al.

(10) Patent No.: US 8,536,745 B2
(45) Date of Patent: Sep. 17, 2013

(54) LINEAR VIBRATOR

(75) Inventors: Kwang Hyung Lee, Gyunggi-do (KR); Jun Kun Choi, Gyunggi-do (KR); Hwa Young Oh, Seoul (KR); Jee Sung Lee, Gyunggi-do (KR); Je Hyun Bang, Gyunggi-do (KR); Yong Jin Kim, Gyunggi-do (KR); Kyung Ho Lee, Gyunggi-do (KR); Seok Jun Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 282 days.

(21) Appl. No.: 12/814,256

(22) Filed: Jun. 11, 2010

(65) Prior Publication Data
US 2011/0227426 A1 Sep. 22, 2011

(30) Foreign Application Priority Data

Mar. 19, 2010 (KR) .................. 10-2010-0024861

(51) Int. Cl.
*H02K 5/00* (2006.01)
(52) U.S. Cl.
USPC ............................................. 310/71; 310/81

(58) Field of Classification Search
USPC .............. 310/71, 81, 15, 17, 36, 12.01
See application file for complete search history.

(56) References Cited

U.S. PATENT DOCUMENTS

| 5,214,331 | A  | * | 5/1993 | Yonei ............................. 310/71 |
| 7,105,962 | B2 | * | 9/2006 | Yoshida et al. ................. 310/71 |
| 7,222,409 | B2 | * | 5/2007 | Yoshida et al. ................. 29/598 |
| 2003/0151317 | A1 |   | 8/2003 | Yoshida et al. |
| 2006/0002577 | A1 | * | 1/2006 | Won et al. ...................... 381/396 |

OTHER PUBLICATIONS

Office Action from counterpart Chinese Patent Application No. 201010224137.7, mailed Jan. 5, 2013, 14 pages, English Summary included.

* cited by examiner

*Primary Examiner* — Dang Le
(74) *Attorney, Agent, or Firm* — Blakely, Sokoloff, Taylor & Zafman LLP

(57) ABSTRACT

Disclosed herein is a linear vibrator having a mass body which is accommodated in a casing defining an internal space and is vibrated. The linear vibrator includes a bracket supporting the linear vibrator from a lower position. The bracket has a depression in a bottom thereof such that a coil lead wire of a coil is placed in the depression, thus preventing friction between the coil lead wire and a movable unit.

6 Claims, 3 Drawing Sheets

LINEAR VIBRATOR

CROSS REFERENCE TO RELATED APPLICATION

This application claims the benefit of Korean Patent Application No. 10-2010-0024861, filed on Mar. 19, 2010, entitled "LINEAR VIBRATOR", which is hereby incorporated by reference in its entirety into this application.

BACKGROUND OF THE INVENTION

1. Technical Field

The present invention relates to a linear vibrator.

2. Description of the Related Art

A vibration motor is a part which converts electric energy into mechanical vibration using the generating principle of electromagnetic force, and is mounted on a mobile phone to be used as a mute call indicating means. As the market for mobile phones is growing rapidly and a variety of functions are being added to the mobile phone, the parts of the mobile phone are being required to be miniaturized and of high quality. Thus, a new structure for a vibration motor, which overcomes the drawbacks of the conventional vibration motor and dramatically improves the quality of the conventional vibration motor, is required.

In recent years, as many mobile phones coming onto the market have large LCD screens and the mobile phones have adopted a touch screen manner, the use of a vibration motor to generate vibrations when a touch screen is touched has increased. Especially, the vibration motor for generating vibrations when the touch screen is touched must meet the following requirements. First, as the number of times the vibration motor is used to generate vibrations when the touch screen is touched is larger than the number of times the vibration motor is used to generate vibrations when a call is received, a long operating lifespan is required. Second, the vibrational response must become fast according to the speed at which the screen is touched, thus providing a high sense of satisfaction to the user who is touching the touch screen and feeling the vibrations.

A conventional vibration motor which has been widely used generates rotating force and rotates a rotary part using an eccentric mass, thus obtaining mechanical vibrations. The rotating force undergoes commutation through a contact point of a brush and a commutator, so that an electric current is supplied to a rotor coil. However, the brush type motor using the commutator is problematic in that, when the motor is rotated, the brush passes through a gap between segments of the commutator, thus causing mechanical friction and electric sparks, leading to abrasion, or generating impurities such as black powder and thereby shortening the lifespan of the motor.

Further, when a voltage is applied to the motor, it takes a long time to reach a target amount of vibrations because of the inertia of the rotary unit having the eccentric mass, so that the response becomes slow and thus it is difficult to realize vibrations suitable for a touch screen phone.

In order to overcome the drawbacks of lifespan and response and to realize the vibrating function of a touch screen phone, linear vibrators are widely used.

The linear vibrator does not use the rotating principle of a motor, but is excited by an electromagnetic force having a resonance frequency which is determined using a spring installed in the vibrator and a movable unit hanging on the spring, thus generating vibrations. Here, the electromagnetic force is generated when a magnet placed on a moving mass part interacts with the direct current or alternating current having a predetermined frequency of a coil placed on a support plate.

However, the linear vibrators which are being applied currently are generally located at the corner of a mobile phone, thus generating vibrations in a vertical direction relative to an LCD screen. The linear vibrator has an outer diameter of about 10 mm and a thickness of about 4 mm. However, the thickness of a linear vibrator designed to vibrate in a vertical direction is limited because a mass body installed in the vibrator must be able to be displaced vertically in a space having a thickness of about 4 mm in order to generate vibrations. Since the mounting space of a mobile phone is limited, using an increase in the thickness of the linear vibrator so as to obtain a desired amount of vibrations is limited.

In order to overcome the problems, the mass body in the linear vibrator may be constructed to move in a horizontal direction relative to the LCD screen of the mobile phone. The horizontal movement has a smaller spatial limitation, in comparison with the vertical movement. Further, it is relatively easy to realize a vibrator having a length of from 8 to 12 mm which is larger than the vertical thickness of about 4 mm.

Therefore, the present invention is intended to protect a coil lead wire from irregular movement when a mass body vibrates, in a linear vibrator constructed to have a thickness which is equal to or smaller than the conventional linear vibrator and constructed so that the mass body moves in a horizontal direction so as to improve a sensible amount of vibrations in a mobile phone.

SUMMARY OF THE INVENTION

The present invention has been made in an effort to provide a linear vibrator, which is capable of preventing abrasion and friction between a movable unit and a coil lead wire when a mass body vibrates.

In a linear vibrator according to an embodiment of the present invention, a mass body is accommodated in a casing defining the internal space of the linear vibrator and is vibrated. A bracket supports the linear vibrator from a lower position, and has a depression in a bottom thereof such that a coil lead wire of a coil is placed in the depression, thus preventing friction between the coil lead wire and a movable unit.

A depth of the depression may be larger than a thickness of the coil lead wire so that the coil lead wire is embedded in the depression, thus preventing friction between the coil lead wire and the movable unit.

Further, the bracket may further include a circuit board provided on an upper portion thereof for electric connection.

In a linear vibrator according to another embodiment of the present invention, a mass body is accommodated in a casing defining the internal space of the linear vibrator and is vibrated. A bracket supports the linear vibrator from a lower position, and has a protrusion in a bottom thereof such that a coil lead wire of a coil is placed in a space confined within the protrusion, thus preventing friction between the coil lead wire and a movable unit.

A height of the protrusion may be larger than a thickness of the coil lead wire so that the coil lead wire is embedded in the protrusion, thus preventing friction between the coil lead wire and the movable unit.

The protrusion may have a linear shape.

The bracket may further include a circuit board provided on an upper portion thereof for electric connection.

The bracket may further include a depression in the bottom thereof.

As is apparent from the above description, a linear vibrator according to the present invention provides an advantage in that a depression or a protrusion is formed in the bottom of a bracket, and a coil lead wire is placed inside the depression or the protrusion, thus preventing disconnection and abrasion resulting from a movable unit making contact with the coil lead wire when the linear vibrator is operated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
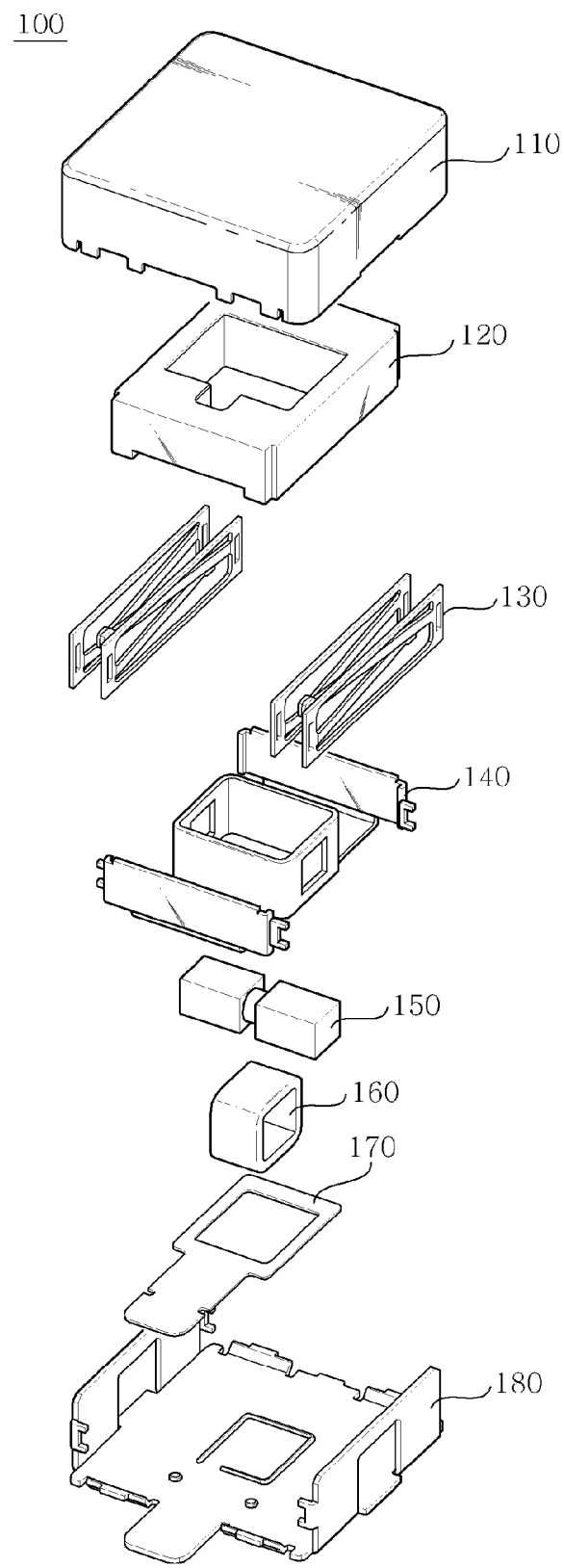
FIG. 1 is an exploded perspective view illustrating a linear vibrator according to an embodiment of the present invention.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted.

Hereinafter, a linear vibrator according to the preferred embodiment of the present invention will be described in detail with reference to the accompanying drawings.

As shown in FIGS. 1 to 5, a linear vibrator according to the present invention includes a casing 110, a mass body 120, an elastic member 130, a yoke 140, a magnet 150, a coil 160, a board 170 and a bracket 180.

The casing 110 is an accommodating member having an internal space of a predetermined size, with the mass body 120, a vibratory unit, and a stationary unit being provided in the casing 110.

The mass body 120 interacts with the magnet 150 in response to the power signal of the coil 160, thus generating linear vibrations. Here, the mass body 120 preferably has a specific gravity which is heavier than iron (Fe). This increases the mass of the vibrator for the same volume, thus adjusting a resonance frequency F related to the mass of the vibrator, and maximizing an amount of vibrations.

The mass body 120 is enlarged laterally to have a larger mass. Such a construction also increases the mass for a given volume, thus maximizing an amount of vibrations.

Generally, in the linear vibrator using a resonance frequency F, as shown in the following [Equation 1], the resonance frequency F is determined by the mass m of the mass body 120 and the elastic modulus k of the elastic member 130. When power having the resonance frequency F is applied to the coil 160 and electric current flows in the coil 160, the vertical displacement and vibration of the mass body 120 assume maximum values.

$$F = \frac{1}{2\pi}\sqrt{\frac{k}{m}}$$ [Equation 1]

In order to correct the natural frequency of the linear vibrator 100, the mass unit 120 is provided with at least one hole (not shown) to add to or subtract from the mass of the mass unit 120.

One side of the elastic member 130 is attached to the mass body 120, while the other side is attached to the casing 110, thus elastically supporting the linear vibration of the mass body 120. The elastic modulus of the elastic member 130 affects the natural frequency of the mass body 120.

Further, the elastic member 130 is held in the internal space of the casing 110 in the form of a coil spring or a plate spring and is coupled to the mass body 120, thus generating elastic force.

The yoke 140 is provided under the mass body 120 and the elastic members 130, and receives the magnet 150 therein. The yoke 140 may uniformly induce the intensity of the magnetic field in cooperation with the magnet 150.

The magnet 150 is placed in the coil 160 and interacts with an electric current flowing through the coil 160 to generate electromagnetic force in the direction of the central axis of the coil 160.

When an electric current of a predetermined frequency is applied to the coil 160, a magnetic field is induced around the coil 160. The power signal of the coil 160 is applied to the mass body 120, so that the mass body 120 interacts with the magnet 150 and thus generates linear vibrations of the mass body 120.

Various electronic circuits and passive elements are mounted on the board 170 and connected to transceive electric signals. The board 170 is provided under the yoke 140.

The bracket 180 is provided under the board 170, thus supporting the parts of the linear vibrator 100 from a lower position. Here, the bracket 180 is made of a non-magnetic or weakly magnetic substance so as not to affect the drive unit.

Figure 2:
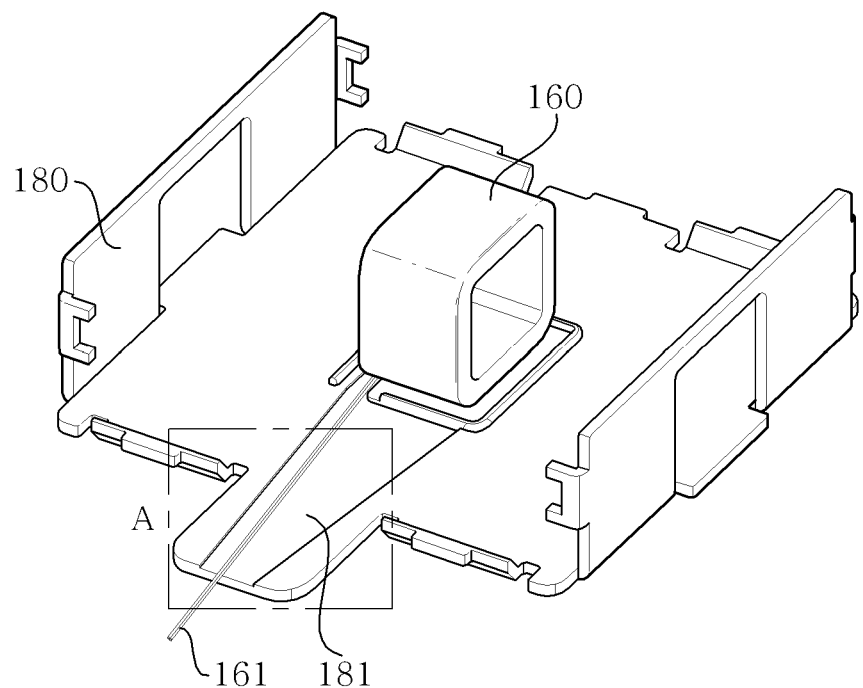
FIG. 2 is a perspective view illustrating a part of the linear vibrator of FIG. 1.

FIG. 2 illustrates a depression 181 formed in the bottom of the bracket 180 of the linear vibrator 100 according to the present invention.

The depression 181 functions to prevent disconnection caused by the movable unit making contact with a coil lead wire 161 extended from an end of the coil 160 when the linear vibrator 100 is operated. The depth of the depression 181 must be larger than at least the thickness of the coil lead wire 161 so as to prevent friction between the coil lead wire 161 and the movable unit.

Figure 3:
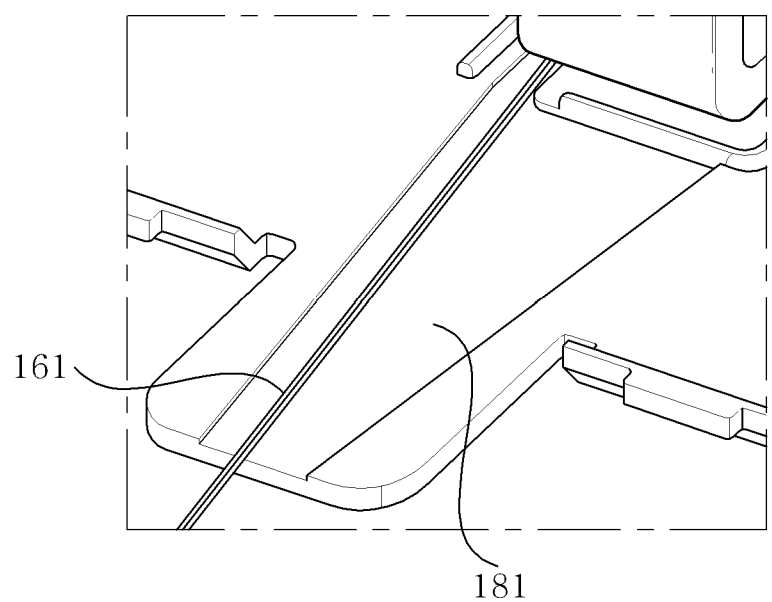
FIG. 3 is an enlarged view illustrating a part of the linear vibrator of FIG. 2.

FIG. 3 is an enlarged view illustrating portion A of FIG. 2, wherein the coil lead wire 161 is embedded into the depression 181.

The depression 181 is not limited to a specific shape and size, as long as the coil lead wire 161 may be embedded in the depression 181 such that friction does not occur between the coil lead wire 161 and other parts.

Figure 4:
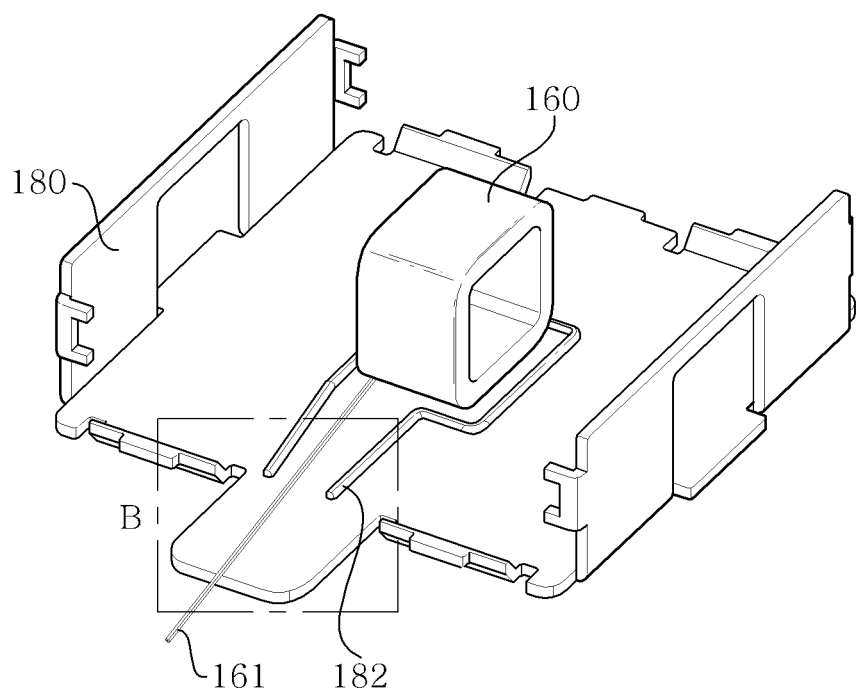
FIG. 4 is a perspective view illustrating a part of a linear vibrator according to another embodiment of the present invention.

FIG. 4 illustrates a protrusion 182 which is provided on the bottom in a bracket 180 of a linear vibrator 100 according to the present invention.

The protrusion 182 functions to prevent disconnection caused by a movable unit making contact with a lead wire 161 of a coil 160 when the linear vibrator 100 is operated. The thickness of the protrusion 182 must be larger than at least the thickness of the coil lead wire 161 so as to prevent friction between the coil lead wire 161 and the movable unit.

The shape of the protrusion 182 is not limited to a specific shape. The protrusion 182 may protrude in a linear shape.

Figure 5:
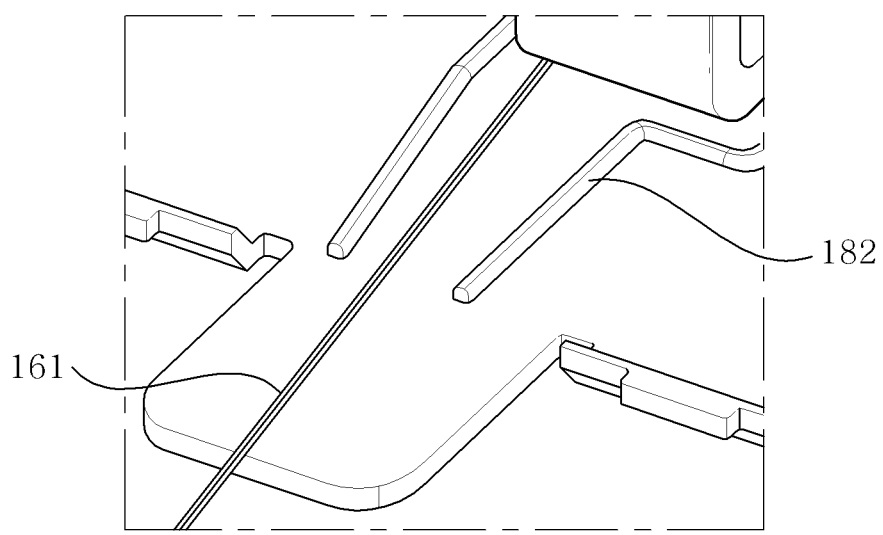
FIG. 5 is an enlarged view illustrating a part of the linear vibrator of FIG. 4.

FIG. 5 is an enlarged view illustrating portion B of FIG. 4. Referring to the drawing, the coil lead wire 161 is placed in a space confined within the protrusion 182.

Either of the depression 181 or the protrusion 182 may be provided in the bottom of the bracket 180. However, if necessary, both the depression 181 and the protrusion 182 may be provided in the bottom of the bracket 180.

The linear vibrator 100 according to the present invention is constructed so that the depression 181 or the protrusion 182 is formed in the bottom of the bracket 180, and the coil lead wire 161 is placed in a space confined within the depression 181 or the protrusion 182, thus preventing disconnection and abrasion caused by the movable unit making contact with the coil lead wire 161 when the linear vibrator 100 is operated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear vibrator having a mass body which is accommodated in a casing defining an internal space and is vibrated, the linear vibrator comprising:
    a mass body;
    an elastic member, one side of the elastic member attached to the mass body and the other side of the elastic member attached to the casing so as to elastically support linear vibration of the mass body;
    a magnet placed in a coil and interacting with an electric current flowing through the coil to generate an electromagnetic force in the direction of the central axis of the coil;
    a movable unit having a yoke provided under the mass body and the elastic member and receiving the magnet therein; and
    a bracket supporting the linear vibrator from a lower position and having a depression in a bottom of the bracket,
    a depth of the depression being larger than a thickness of a coil lead wire of the coil, the coil lead wire placed in the depression to prevent friction between the coil lead wire and a movable unit.

2. The linear vibrator as set forth in claim 1, wherein the bracket further comprises a circuit board provided on an upper portion thereof for electric connection.

3. A linear vibrator having a mass body which is accommodated in a casing defining an internal space, the linear vibrator comprising:
    a mass body;
    an elastic member, one side of the elastic member attached to the mass body and the other side of the elastic member attached to the casing so as to elastically support linear vibration of the mass body;
    a magnet placed in a coil and interacting with an electric current flowing through the coil to generate electromagnetic force in the direction of the central axis of the coil;
    a movable unit having a yoke provided under the mass body and the elastic member and receiving the magnet therein; and
    a bracket supporting the linear vibrator from a lower position and having a protrusion in a bottom of the bracket,
    a height of the protrusion being larger than a thickness of a coil lead wire of the coil, the coil lead wire placed in a space confined within the protrusion to prevent friction between the coil lead wire and a movable unit.

4. The linear vibrator as set forth in claim 3, wherein the protrusion has a linear shape.

5. The linear vibrator as set forth in claim 3, wherein the bracket further comprises a circuit board provided on an upper portion thereof for electric connection.

6. The linear vibrator as set forth in claim 3, wherein the bracket further comprises a depression in the bottom thereof.

* * * * *